United States Patent
He

[19]

[11] Patent Number: 5,862,351
[45] Date of Patent: Jan. 19, 1999

[54] MOTHERBOARD WITH AUTOMATIC CONFIGURATION

[76] Inventor: Zhi Qiang He, 41458 Christy St., Fremont, Calif. 94538

[21] Appl. No.: 739,727

[22] Filed: Nov. 7, 1996

[51] Int. Cl.⁶ .................................................. G06F 13/00
[52] U.S. Cl. ........................................... 395/284; 395/651
[58] Field of Search .................................. 395/284, 828, 395/651–653

[56] References Cited

U.S. PATENT DOCUMENTS

| | | |
|---|---|---|
| 4,967,346 | 10/1990 | Freidin . |
| 5,086,501 | 2/1992 | De Luca et al. .................... 395/750.01 |
| 5,371,892 | 12/1994 | Petersen et al. . |
| 5,594,874 | 1/1997 | Narayanah et al. ..................... 395/284 |
| 5,675,794 | 10/1997 | Meredith ................................. 395/651 |
| 5,754,833 | 5/1998 | Singh et al. ............................ 395/551 |

FOREIGN PATENT DOCUMENTS

| | | |
|---|---|---|
| 0 510 241 | 10/1992 | European Pat. Off. . |
| 2 271 446 | 4/1994 | United Kingdom . |

*Primary Examiner*—Meng-Ai T. An
*Assistant Examiner*—Paul R. Myers
*Attorney, Agent, or Firm*—Richard C. Litman

[57] ABSTRACT

The present invention is a logic circuit and a special module of BIOS for a computer motherboard that automatically reconfigures the motherboard to accept different microprocessors, (CPUs). Each series of CPUs includes different types having different parameters including: manufacturers; basic frequencies; multipliers; and operating voltages. These different parameters must be set on a conventional motherboard by opening and closing jumpers and/or dip-switches. The present invention avoids the need for changing these jumpers or switches by using the Basic Input/Output System, (BIOS), to instruct a logic circuit to set the proper voltage, frequency and multiplier for the specific CPU installed in the motherboard. When a user wishes to upgrade their computer, they remove the old CPU, insert the new CPU and turn on the computer. When the computer "powers up" the operating system senses whether a "hot key", (this can be preprogrammed to be any of the keys on the keyboard), is being or has been pressed. When the hot key has been pressed, the computer enters BIOS setup and the operator can then change the CPU parameters, (voltage, frequency and multiplier), as displayed on the screen. If the hot key is not pressed, the computer simply uses the parameters as previously defined. As with conventional personal computers, the BIOS can be entered from resets other than power-up and the CPU configuration can be changed without turning the computer off.

6 Claims, 4 Drawing Sheets

MOTHERBOARD WITH AUTOMATIC CONFIGURATION

BACKGROUND OF THE INVENTION

1. Field of the Invention

The present invention relates to a motherboard for a personal computer that automatically configures itself for the speed, multiplier and voltage required for the type of microprocessor, (CPU), installed in the motherboard.

2. Description of the Prior Art

Today's personal computers are evolving at an ever increasing speed. Since the introduction of Intel's 386DX there have been several types of CPUs manufactured for each series. For each type of CPU three parameters must be selected, and these include the frequency, (ranging from 33 MHz–75 MHz), multiplier of the CPU frequency, (ranging from 1.5–3), and operating voltage, (including 5 volts, 3.3 volts, 2.5 volts, etc.). The frequency, voltage and multiplier for each type of microprocessor are normally selected by changing jumpers or dip-switches located on the motherboard. Several other methods for reconfiguring different computer options have been employed by prior art devices and the following documents illustrate some of these. U.S. Pat. No. 4,967,346, (Freidin) discloses a universal microprocessor interface for accepting different processors on the same motherboard. U.S. Pat. No. 5,371,892, (Petersen et al.) discloses a method for upgrading a personal computer by utilizing the set-up (i.e., power up) initialization of the computer to change any settings identifying upgrades. European Patent Document No. 0,510,241 discloses a computer system for changing the particular processor, (i486), having differing clock speeds without having to alter any jumper or dip-switch settings. British Patent No. 2,271,446 discloses a kit for a user to build a computer, having simplified upgradable characteristics.

None of the above inventions and patents, taken either singly or in combination, is seen to describe the instant invention as claimed.

SUMMARY OF THE INVENTION

The present invention is a logic circuit and a special module of BIOS for a computer motherboard that automatically reconfigures the motherboard to accept different microprocessors, (CPUs) within a particular generation or class. Each generation of CPUs, (486, Pentium, Pentium Pro, etc.), includes different series having different parameters including: manufacturers, (Intel, AMD, Cyrix, etc.); basic frequencies, (50 MHz, 60 MHz, 66 MHz, 75 MHz, etc.); multipliers, (1.5×, 2.0×, 2.5×, 3.0×, etc.); and operating voltages, (3.3V, 2.8V, etc.). As discussed above, these different parameters must be set on a conventional CPU upgradable motherboard by opening and closing jumpers and/or dip-switches. Many times more than five jumpers or dip-switches must be changed when the CPU is upgraded to a different CPU within the same generation or class. These jumpers and dip-switches are often in hard to reach areas of the motherboard, and usually require removing the motherboard from the computer case. The present invention avoids the need for changing these jumpers or switches by using the Basic Input/Output System, (BIOS), to instruct a logic circuit to set the proper voltage, frequency and multiplier for the specific CPU installed in the motherboard. When a user wishes to upgrade their computer according to the instant invention, they need only remove the old CPU, insert the new CPU and turn on the computer. In many computers the CPU can be changed by simply opening the computer's case, and does not require removing the motherboard from the case. When the computer "powers up" the operating system senses whether a "hot key", (this can be preprogrammed to be any of the keys on the keyboard), is being or has been pressed. When the hot key has been pressed, the computer enters BIOS setup and the operator can then change the CPU parameters, (voltage, frequency and multiplier), as displayed on the screen. If the hot key is not pressed, the computer simply uses the parameters as previously defined. As with conventional personal computers, the BIOS can be entered from resets other than power-up and the CPU configuration can be changed without turning the computer off.

Accordingly, it is a principal object of the invention to allow an operator to up-grade the CPU of their personal computer without having to remove the motherboard from the computer or reset jumpers and/or dip-switches.

It is another object of the invention to allow changing the configuration of the computer using BIOS only.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 4:
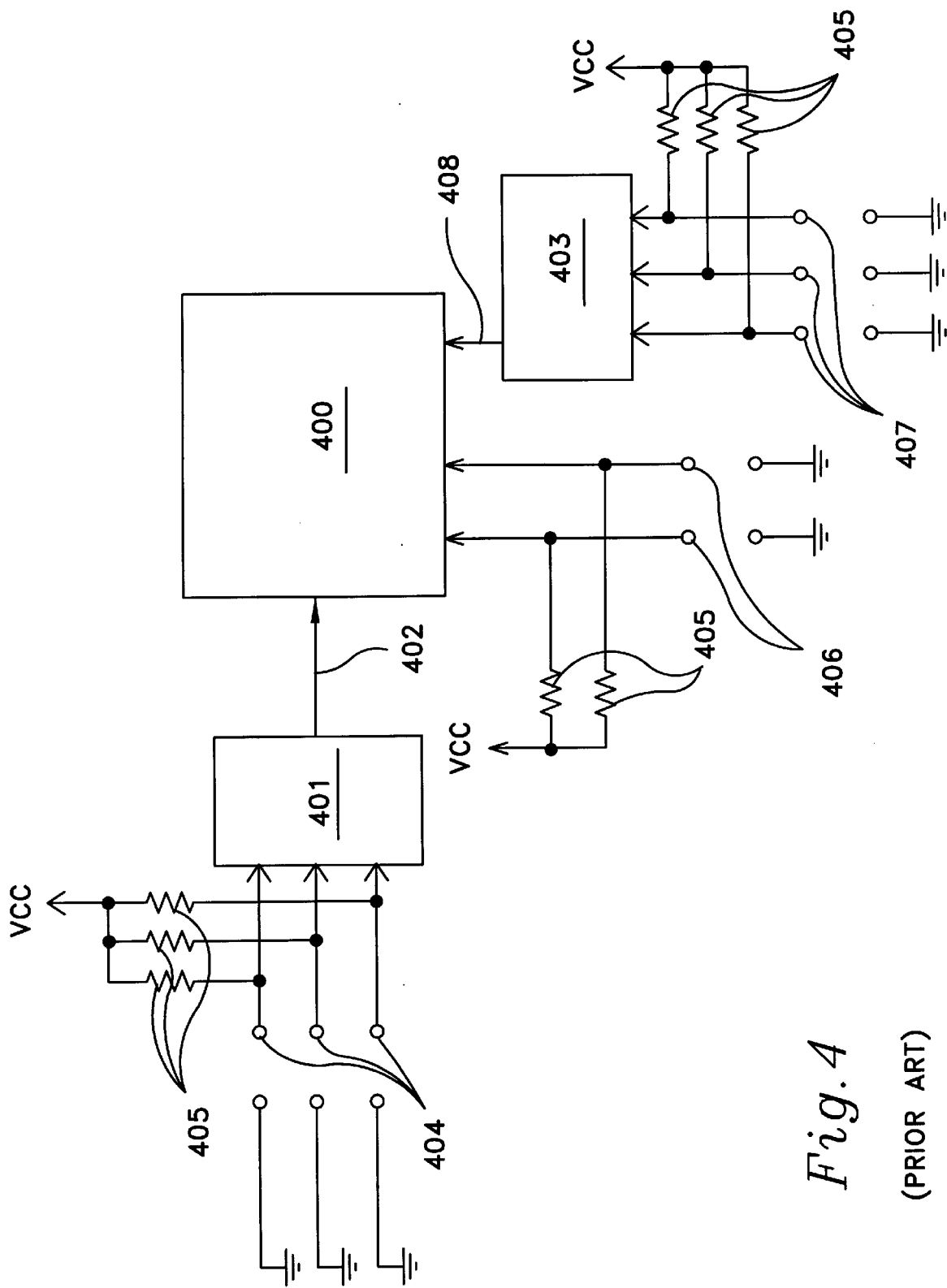
FIG. 4 is a circuit diagram of the CPU, voltage generator and clock chip as controlled by jumpers in prior art motherboards.

The present invention is drawn to configuring a computer motherboard to operate with a specific microprocessor. In conventional computer motherboards, the operating voltage, frequency and multiplier are selected by physically changing jumpers or dip-switches on the motherboard. FIG. 4 shows one type of prior art circuit used to accomplish this. A microprocessor 400 has inputs for an operating voltage 402, multiplier selectors 406, (BF-1 and BF-2), and a CPU clock 408. The operating voltage is provided by a CPU voltage generator 401 that determines the proper voltage by reading three inputs 404, (VCC2A, VCC2B, and VCC3). The CPU clock input 408 operates at a frequency determined by reading three inputs 407, (SEL1, SEL2 and SEL3). The multiplier selectors 406, voltage determining inputs 404 and frequency determining inputs 407 are tied to ground using jumpers, (or closing dip-switches), to provide logic low levels. For inputs that require a logic high level, the jumpers are removed, (or the dip-switches are opened), and pull-up resisters 405 provide $V_{CC}$ potential. High-low combinations of these inputs select the various functions as listed in Table 1 below.

TABLE 1

| | \multicolumn{7}{c}{CPU Frequency Selection} | | | | | | |
|---|---|---|---|---|---|---|---|
| | FO1 | FO2 | FO3 | FO4 | FO5 | FO6 | FO7 |
| SEL1 | 0 | 1 | 0 | 1 | 0 | 1 | 0 |
| SEL2 | 0 | 0 | 1 | 1 | 0 | 0 | 1 |
| SEL3 | 0 | 0 | 0 | 0 | 1 | 1 | 1 |

| | \multicolumn{7}{c}{CPU Voltage Selection} | | | | | | |
|---|---|---|---|---|---|---|---|
| | V1 | V2 | V3 | V4 | V5 | V6 | V7 |
| VCC2A | 0 | 1 | 0 | 1 | 0 | 1 | 0 |
| VCC2B | 0 | 0 | 1 | 1 | 0 | 0 | 1 |
| VCC3 | 0 | 0 | 0 | 0 | 1 | 1 | 1 |

| | \multicolumn{4}{c}{CPU Multiplier Selection} | | | |
|---|---|---|---|---|
| | X1.5 | X2 | X2.5 | X3 |
| BF1 | 1 | 0 | 0 | 1 |
| BF2 | 1 | 1 | 0 | 0 |

The above table illustrates the method different frequencies, voltages and multipliers are selected for specific microprocessors. It should be noted that the different frequencies, (FO1–FO7), range from 33 MHz to 75 MHz and therefore the frequency settings would follow a format similar to FO1=33 MHz, FO7=75 MHz, with the intermediate steps, (FO2–FO6), being increments therebetween. The different voltages are arranged in a like manner wherein V1 may equal 2.8 volts, V2 may equal 3.3 volts, etc. These values for the frequencies, voltages and multipliers, (listed in Table 1), are given only as examples, and the actual values would be displayed and selected using the BIOS of the particular computer in use.

While the circuit shown in FIG. 4 is prior art, the present invention uses the same setup as the microprocessor, CPU clock and CPU voltage generator. The difference between the prior art circuit and the circuit of the present invention can be seen by viewing FIG. 2. This circuit includes a microprocessor 200, a CPU clock 203 and a CPU voltage generator 201, however, it should be noted that the jumpers, (or dip-switches) and the pull-up resisters 405 have been eliminated as unnecessary for the circuit of the present invention. SEL1, SEL2 and SEL3 are listed in FIG. 2 as 116–118 respectively, BF1 and BF2 are listed as 115 and 114 respectively, and VCC2A, VCC2B and VCC3 are listed as 113–111 respectively. As in the prior art the CPU voltage generator supplies the CPU with operating voltage at line 202, while the CPU clock supplies the clock frequency at line 204.

Figure 1:
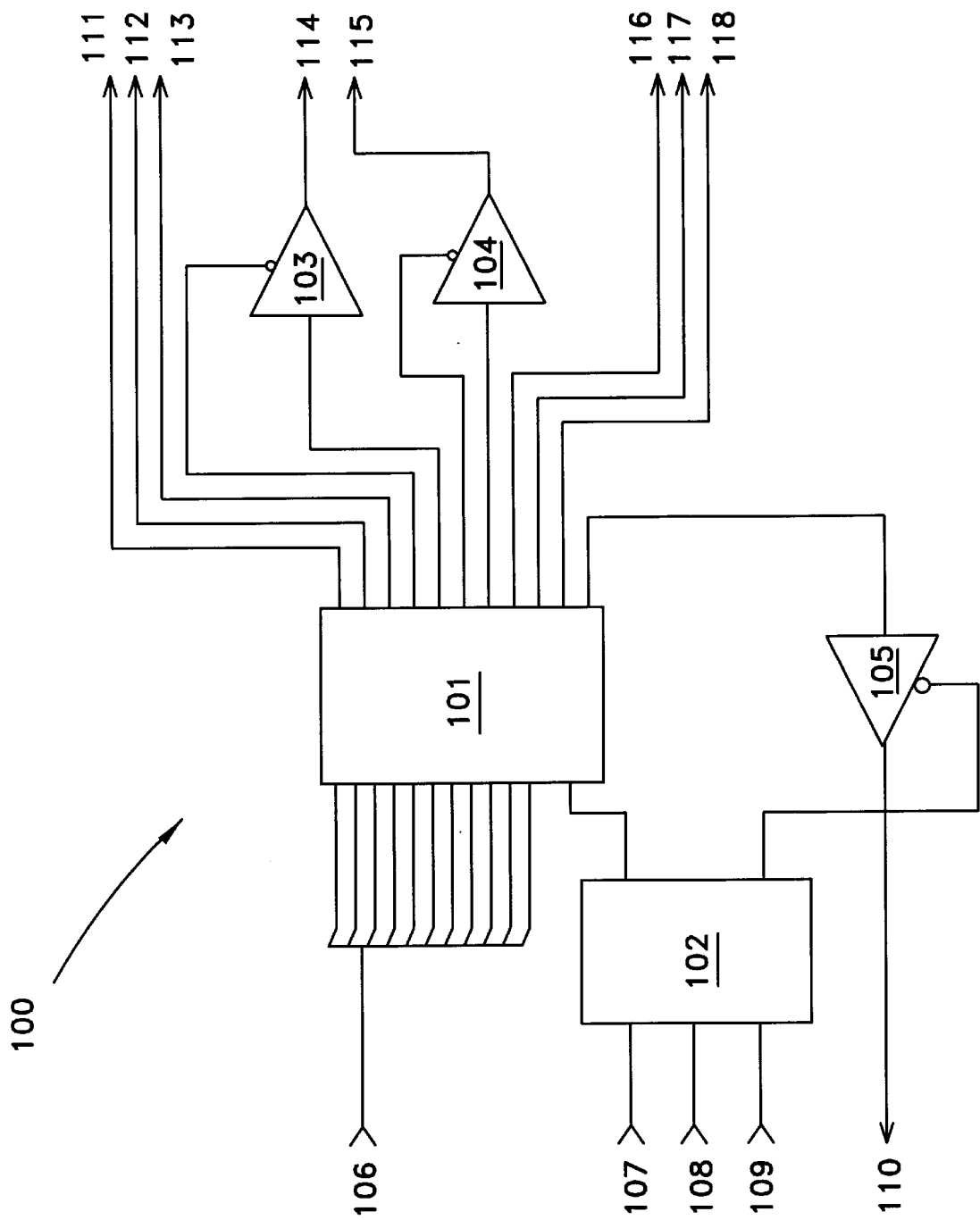
FIG. 1 is a circuit diagram of the control logic used to set the CPU frequency, multiplier and voltage in accordance with the present invention.
Figure 2:
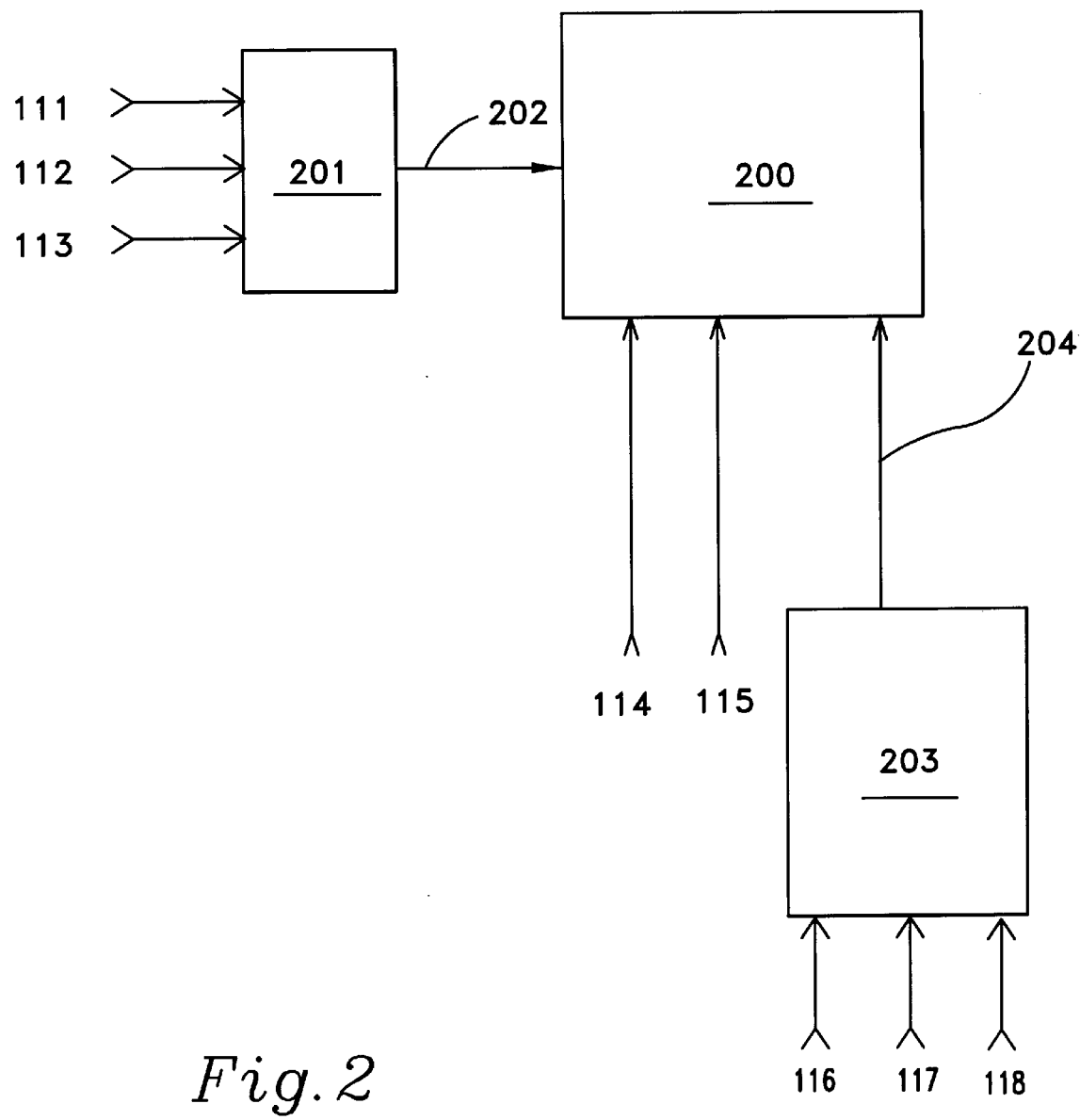
FIG. 2 is a circuit diagram of the CPU, voltage generator and clock chip as controlled by the present invention.

The various selection inputs to control the circuit in FIG. 2 are generated using the logic circuit 100 shown in FIG. 1. Data latches 101 are connected to eleven of the computer data lines 106 that provide the programming information when the CPU 200 is prompted by the BIOS program. A decoder 102 triggers the data latches 101 when the correct address is provided via address line 107. Lines 108 and 109 are WR and RD respectively and are also used by the CPU 200 and BIOS to prompt the decoder 102 to download the data lines' information via the data latches 101 for reconfiguration. The decoder 102 also triggers solid state relay 105 by providing a logic low level to the control port of the solid state relay 105. When the solid state relay 105 is triggered it provides a "data in" signal at 110 to the CPU (i.e. 486, Pentium, Pentium Pro, etc.) which signals the CPU that the new parameters have been provided at lines 111–118, and assists in testing the reset status. Two additional solid state relays, 103 and 104 are provided on the 114 and 115 lines, (BF2 and BF1 respectively), and these relays operate in a similar manner to solid state relay 105, and are triggered by two of the eleven data lines, (after being latched by data latches 101). Solid state relays 103–105 are necessary because several other devices also drive the data in, BF1 and BF2 lines, and these devices insure that two devices do not attempt to drive the same line at the same time.

Figure 3:
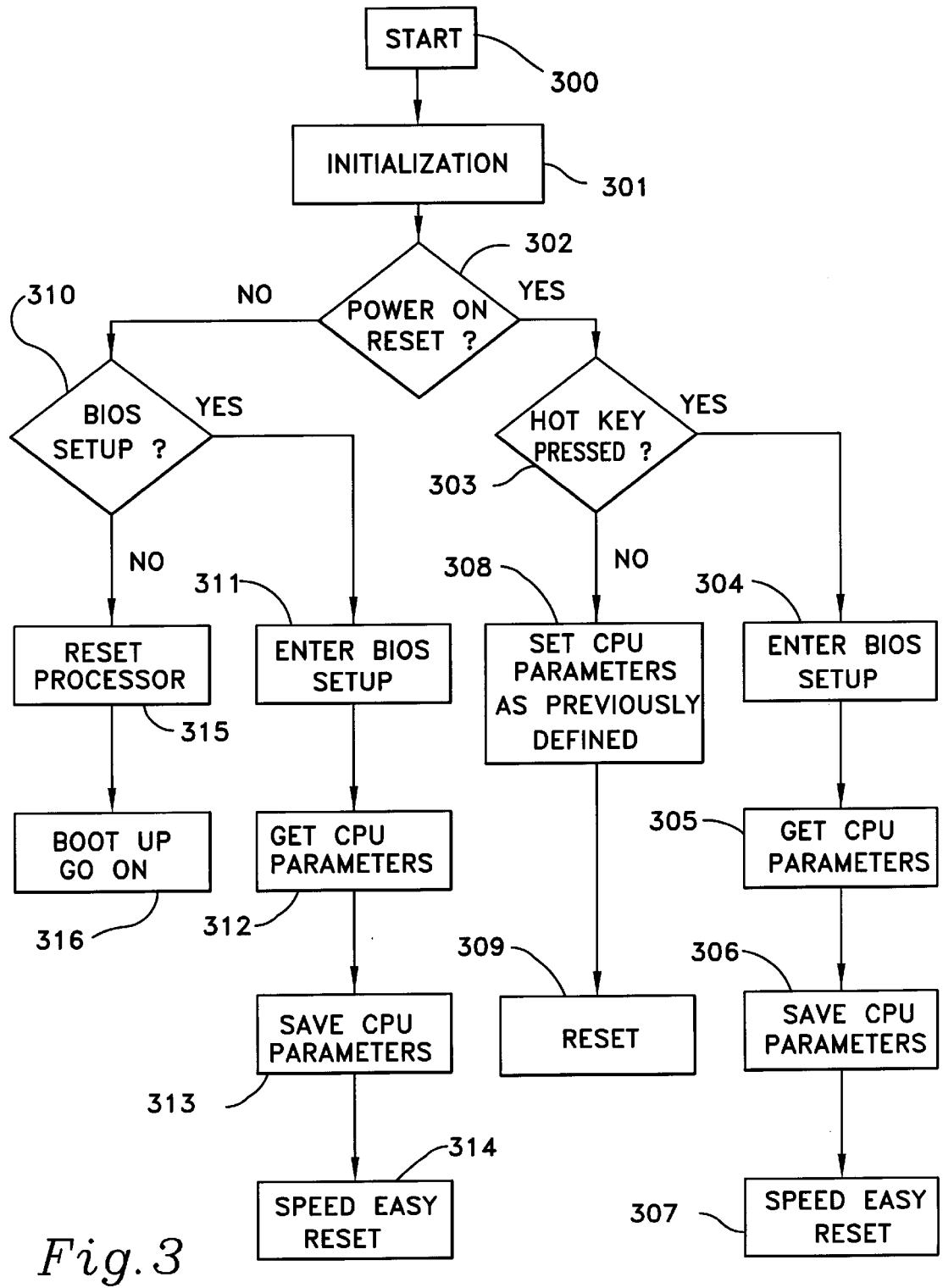
FIG. 3 is a flow chart of the BIOS operation used to set the CPU frequency, multiplier and voltage in accordance with the present invention.

FIG. 3 is a flow chart explaining the operation of the BIOS software used to configure the motherboard via the control logic explained above. Any type of reset, (system power on, system reset and CPU reset), will initialize the BIOS at "Start" block 300. The system then proceeds to the Initialization block 301 where certain system components are reset, (depending on the type of reset as is well known in the art), such as clearing RAM, spinning up any hard drives, etc. From the Initialization block 301 the system proceeds to block 302, where it is determined if the reset was caused by powering up the computer. At this point we will consider that the reset was caused by powering up the computer, (as would be necessary when replacing the CPU), and following the "Yes" line the system proceeds to block 303. In block 303 it is determined if the "Hot Key" has been pressed by the computer operator. After the CPU has been replaced with a different type of CPU, the operator must turn on the computer and also press the Hot Key to enter the BIOS configuration setup. Assuming this is the case, the system proceeds from block 303 to block 304. In block 304 the BIOS setup subroutine is entered and the BIOS screen is displayed on the PC's monitor, (as is well known in the art). The difference between the BIOS screen displayed by prior art devices and the present invention is that the BIOS screen of the present invention has blocks for entering the CPU frequency, multiplier and voltage as discussed in detail above. After the operator has entered, in block 305, the parameters for their specific CPU, (usually supplied by the CPU manufacturer in the CPU's package), the CPU saves these parameters, block 306, by using the CMOS RAM of the motherboard and the data latches 101 as explained above. Once the parameters have been saved, the system resets, a "Speed Easy" reset as named by the inventor, at block 307 and the system returns to block 300.

If the power up reset had not been followed by the operator pressing the Hot Key, the system would proceed from block 303 to block 308. In block 308 the previously defined parameters, (stored in the CMOS RAM), are used to operate the CPU. The system then proceeds to block 309 which gives a standard reset and returns the system to block 300.

If the reset is not of a power up type, (system reset, CPU reset, or Speed Easy reset), the system proceeds from block 302 to block 310. At block 310 the operator is given the option to enter BIOS setup as is standard in conventional computer systems, (usually by pressing the DEL key during boot-up). If the operator enters BIOS setup, the system proceeds from block 310 to block 311, and the BIOS setup continues through blocks 312–314 as explained above for blocks 305–307. It should be noted that whenever BIOS setup is entered, blocks 304 and 311, not only can the parameters for the CPU be changed, but all of the standard computer parameters, (RAM, I/O ports, etc.), can be changed as is well known in the PC art. If BIOS setup is not entered, the system proceeds from block 310 to block 315 where the processor is reset. After the processor is reset, (not to be confused with CPU reset), the system proceeds to block 316, the boot up sequence is completed, and the disc operating system, DOS, is entered. From the above information, it can be seen that a power on reset without intervention on the part of the operator, will proceed as follows: block 300 to block 301 to block 302 to block 303 to block 308 to block 309 to block 300 to block 301 to block 302 to block 310 to block 315 to block 316. A non-power up reset, (pressing the system reset button on the computer case, or pressing control, ALT and DEL keys simultaneously for a CPU reset), without further intervention on the part of the operator, will proceed as follows: block 300 to block 301 to block 302 to block 310 to block 315 to block 316.

It should be noted that the above invention is not limited to a complete motherboard, but may be retrofitted on an existing motherboard by use of a module containing the circuitry of FIGS. 1 and 2. In either case the systems BIOS program must be replaced with the BIOS program of the present invention.

It is to be understood that the present invention is not limited to the sole embodiment described above, but encompasses any and all embodiments within the scope of the following claims.

I claim:

1. A module for configuring a motherboard to operate a microprocessor, CPU, said module comprising:

a BIOS program for selecting an operating voltage, a frequency, and a multiplier for a microprocessor installed on a motherboard; and a logic circuit for automatically setting the operating voltage, the frequency, and the multiplier selected by said BIOS program, said logic circuit comprising:

data latches, a decoder, solid state relays, a plurality of inputs including data and address lines associated with said motherboard, and a plurality of outputs including outputs for controlling a CPU clock which provides said operating frequency, outputs for controlling a CPU voltage generator which provides said operating voltage, and outputs connected to said microprocessor to provide said CPU multiplier.

2. The module according to claim 1, wherein:

said BIOS program is preconfigured so that said BIOS program can be entered to change the operating voltage, the frequency, and the multiplier from a power up reset after pressing a hot key.

3. The module according to claim 2, wherein:

said BIOS program is preconfigured such that said BIOS program can be entered to change the operating voltage, the frequency, and the multiplier from a reset other than said power up reset after pressing a BIOS enter key.

4. A motherboard capable of being configured to operate a specific generation of microprocessors, CPUs, said motherboard having a module comprising:

a BIOS program for selecting an operating voltage, a frequency, and a multiplier for a microprocessor installed on a motherboard; and a logic circuit for automatically setting the operating voltage, the frequency, and the multiplier selected by said BIOS program, said logic circuit comprising:

data latches, a decoder, solid state relays, a plurality of inputs including data and address lines associated with said motherboard, and a plurality of outputs including outputs for controlling a CPU clock which provides said operating frequency, outputs for controlling a CPU voltage generator which provides said operating voltage, and outputs connected to said microprocessor to provide said CPU multiplier.

5. The motherboard according to claim 4, wherein:

said BIOS program is preconfigured such that said BIOS program can be entered to change the operating voltage, the frequency, and the multiplier from a power up reset after pressing a hot key.

6. The motherboard according to claim 5, wherein:

said BIOS program is preconfigured such that said BIOS program can be entered to change the operating voltage, the frequency, and the multiplier from a reset other than said power up reset after pressing a BIOS enter key.

* * * * *